United States Patent [19]

Schroeder

[11] Patent Number: 5,026,808
[45] Date of Patent: Jun. 25, 1991

[54] METHOD FOR RECOVERING AND USING LIGNIN IN ADHESIVE RESINS BY EXTRACTING DEMETHYLATED LIGNIN

[75] Inventor: Herbert A. Schroeder, Ft. Collins, Colo.

[73] Assignee: Colorado State University Research Foundation, Ft. Collins, Colo.

[21] Appl. No.: 332,716

[22] Filed: Apr. 3, 1989

[51] Int. Cl.$^5$ ............................................. C08H 5/02
[52] U.S. Cl. .................................... 527/400; 530/501; 530/507; 527/403
[58] Field of Search ................ 527/400; 530/501, 507

[56] References Cited

U.S. PATENT DOCUMENTS

| | | | |
|---|---|---|---|
| 2,042,705 | 6/1936 | Dreyfus | 530/507 |
| 2,247,210 | 6/1941 | Schorger | 530/507 |
| 2,976,273 | 3/1961 | Ball et al. | 530/501 |
| 3,071,570 | 1/1963 | Marton et al. | 530/507 |
| 3,227,667 | 1/1966 | Moffitt et al. | 528/129 |

OTHER PUBLICATIONS

Thermosetting Resins of Demethylated and Tall Oil Lignins; Khiml. Ispol'z Lignina 1974:428–433.
Kraft Lignin Utilization in Adhesives; Wood Science Technology 22:157–165 (1988).
Holzforschung and Holzverwertung; 30:85 ∝ 87 (1978).
The Demethylation and Degradation of Lignin or Spent Liquors by Heating with Alkaline Reagents; Enkvist et al, Tappi 45:128 (1961).
Lignin–Based Wood Adhesives Nimz, Horst H., Polymer Institute, University of Karlsruke, Federal Republic of Germany.
Studies on the Effects of Methylation and Demethylation on Resin Forming Properties of Thiolignin, Smithiana, Picea; Holzsforschung and Holzverwertung 30:85 (1978).
Phenol–Lignin–Formaldehyde Adhesives for Plywood; Guipta et al., Holzforschung and Holzverwertung 30 (1978).
Complex Dibenzofurans; Stjernstrom, Nils; Acta Chem. Scand 16 (1962) No. 3.
Proofs for the Occurrence of Hemoprolocalechuic Acid and Some Other Pyrocatechol and Guaiacol Derivatives in Pressure Heated Ellulose Spent Liquors; Ashorn et al., Acta Chem. Scand. 16 (1962) No. 3.

Primary Examiner—John Kight, III
Assistant Examiner—Frederick Krass
Attorney, Agent, or Firm—Dorr, Carson, Sloan & Peterson

[57] ABSTRACT

Lignin, or a lignin derived material, which has been significantly demethylated (e.g., the demethylated lignin found in the raffinate produced as a by-product of dimethyl sulfide production which can be carried out using the spent liquor from wood pulping operations) can be isolated by a process wherein an organic solvent is added to a lignin-containing aqueous solution. The organic solvent is typically a polar, and at least a partially water-immiscible substance such as, for example, ethyl acetate. The resulting lignin-containing aqueous solution/organic solvent mixture is acidified to produce a water layer which is discarded and an organic solvent layer which contains the demethylated lignin. Upon its recovery, the demethylated lignin is dissolved in an alkaline solution to which an aldehyde source is added to produce a resol-type resin. The aldehyde source may be formaldehyde in solution, paraformaldehyde, hexamethylenetetramine, or other aldehydes including acetaldehyde, furfural, and their derivatives.

15 Claims, No Drawings

METHOD FOR RECOVERING AND USING LIGNIN IN ADHESIVE RESINS BY EXTRACTING DEMETHYLATED LIGNIN

BACKGROUND OF THE INVENTION

1. Field of the Invention

This invention generally relates to the extraction of lignin, especially demethylated lignin, from lignin-containing aqueous solutions such as, for example, from the raffinate which is a by-product of dimethyl sulfide production which is, in turn, a by-product of wood pulping operations. This invention also relates to the use of demethylated lignin in the preparation of resol-type resins such as those employed in the manufacture of wood adhesives used to make structural wood products such as, for example, plywood and particleboard, wood veneers and the like.

2. Description of the Prior Art

Adhesive resins such as those used in the manufacture of structural wood products are either aminoresins or phenolic resins. Aminoresins are polymeric products of the reaction of an aldehyde with compounds containing an amino group, particularly urea and melamine. In virtually all aminoresins the aldehyde component is formaldehyde and by far the dominant aminoresin is urea-formaldehyde because of its relatively low cost compared to other resins used in wood adhesives. The major disadvantage of aminoresins, especially urea-formaldehyde resin, is that they are not totally water resistant, and consequently their gluelines will eventually delaminate. They also are known to release formaldehyde during their slow water hydrolysis.

Phenolic resins are polymeric products of the reaction of an aldehyde with compounds containing a phenolic hydroxyl group. The phenolic component is most often phenol, but may be cresol, resorcinol, or catechol, or the like. The rate of reaction is highly dependent on the relative reactivity of the phenolic substance used. Resorcinol is much more reactive than phenol and consequently is used in "cold-setting" resin adhesives. Catechol is also more reactive than phenol, but somewhat less reactive than resorcinol. The phenolic component used in the manufacture of such resins may also be a mixture of phenolic substances, such as phenol-resorcinol resins. Formaldehyde is the most common aldehyde component although others such as furfural are occasionally used. Phenol and the other phenolic substances are considerably more expensive than urea; however, phenolic resins give weather-and boil-proof gluelines. Moreover, phenolic resins do not release formaldehyde.

The reaction between a phenolic substance and an aldehyde can be either acid catalyzed or base catalyzed. Under acidic conditions and with an excess molar ratio of phenolic component an essentially linear low-degree-of-polymerization "prepolymer" is formed. This material is known as a novolak. Polymerization can be continued to an infusible solid through the addition of sufficient aldehyde. The completely polymerized material, often referred to as cured or hardened, is usually used in molded products. Novolak prepolymers are usually not water soluble; however, under sufficiently basic conditions the novolak may form a salt and become water soluble. Under basic conditions aldehyde can be added to the mixture and a base catalyzed polymerization performed at elevated temperatures.

Under basic conditions and with an excess molar ratio of aldehyde a highly branched low-molecular-weight "prepolymer" resin known as a resol is formed. This material is usually water soluble because of salt formation in the basic solution. No additional aldehyde is required for continued polymerization to an infusible water insoluble product. The polymerization is usually continued by elevating the temperature of the reaction. Resol prepolymers are the phenolic resins usually used for wood adhesives. They are preferred over novolaks for several reasons: (1) The resol adhesive is a single component entity in that no additional aldehyde is required. (2) Their continued polymerization to achieve a highly water-resistant glueline is easily controlled by elevating the temperature. (3) The basic adhesive mixture does not cause long term wood degradation adjacent to the glueline as is the case with acid catalyzed material.

By far, the most common phenolic-type resin for wood adhesives is phenol-formaldehyde resol resin. Resorcinol-formaldehyde cold-setting adhesives are of the novolak-type, but without an acidic catalyst due to their high reactivity. These cold-setting adhesives are two component systems requiring aldehyde addition to the novolak prepolymer immediately before use; otherwise there is no means of controlling the polymerization to an infusible product.

Phenol, as well as the other phenolic substances noted above are relatively expensive. Phenol is also petroleum derived, i.e., it is a petrochemical. In general, it would be regarded as highly advantageous to utilize a less expensive, nonpetrochemical phenolic material in such resins if this were possible. For example, a biomass derived phenolic material which is readily available to the forest products industry, and which is presently under-utilized, would be an ideal substitute for petrochemical derived phenol. Such a substitution would imply that the industry using the wood adhesives also would control the raw material required in the preparation of the resin used in these adhesives.

Lignin is the dominant phenolic substance in biomass and it is grossly under-utilized. Most lignin, especially that which is produced as a by-product of the pulping industry, is used primarily as an energy source. It has long been recognized that this is a low value use of this lignin source; consequently many technical proposals have been made for upgrading the use of this material as well for obtaining an economic advantage over the petroleum derived phenol used for this purpose. The allure of using a biomass lignin resource in wood adhesives has produced patents and other publications which describe the use of lignin in resins used for wood adhesives. The majority of these publications describe the use of various lignin sulfonates, by-products of the sulfite pulping industry, although many other types of lignin are also mentioned. This information is comprehensively covered by H.H. Nimz in "Lignin-Based Wood Adhesives", a chapter in "Wood Adhesives: Chemistry and Technology" edited by A. Pizzi, Marcel Dekker, Inc. publisher (1983).

There are other references made in the literature which more particularly address the use of demethylated lignin in resins for adhesives. Since the methods of this patent disclosure also involve the use of demethylated lignin, a critical review emphasizing how the methods of this patent disclosure differ from what is believed to be the most pertinent of these references is in order. Such a review should begin by first noting that kraft lignin is known to be slightly demethylated during the pulping process. That is to say that, by way of example, the methoxyl content of softwood kraft lignin is 12.6%, whereas that of the original lignin in the original softwood wood is 14.5%. For the purposes of this patent disclosure the term "demethylated lignin", regardless of its source, should be taken to mean lignin which has undergone some substantial degree of demethylation, e.g., such that its methoxy content is from about 11% to essentially 0% by weight of the original lignin material. For purposes of this patent application, the term demethylated lignin should also be taken to mean other lignin derived materials such as, for example, any pulping by-product lignin regardless of process, and by-product lignin from biomass processing which also have been subjected to some degree of demethylation.

Regardless of terminology, it is well known that only slight degrees of demethylation are insufficient to adequately improve the resin forming properties of kraft lignin; consequently many attempts have been made to modify and then utilize kraft lignin, as well as other lignin-containing sources, as substitutes for petroleum derived phenol in the manufacture of wood adhesives.

For example, the publication "Thermosetting Resins of Demethylated and Tall Oil Lignins" in Khim.Ispol'z Lignina 1974:428–433 teaches a process wherein demethylated lignin, which was a product of an alkaline hydrolysis of kraft lignin, is employed. However, it has been noted that an alkali, even at high temperatures, is a poor demethylating agent. Hence, little demethylation can be accomplished by this process as was indicated by its need for petrochemical derived phenol to produce its resin. Moreover, the temperature required for hardening in this process is also high, compared to even a typical phenol-formaldehyde resol resin. This indicates that deactivation rather than activation takes place; this would not occur with substantial demethylation.

A publication titled "Kraft Lignin Utilization in Adhesives" found in Wood Science Technology 22:157-165 (1988), evaluated demethylated lignin in several resins for adhesives. However, since kraft lignin is insoluble in acid solutions such as those of the disclosed acidic chromate solutions, the reaction must be performed in a heterogeneous two-phase system wherein only limited demethylation takes place. In any event, the publication concluded that "Resins prepared with demethylated lignin are not included [in the estimated cost evaluations] due to their deficient behavior in particleboard panels."

A publication by Gapta and Sehgal in Holzforschung and Holzverwertung (1978) 30:85-87 discloses demethylation by hydriodic acid treatment of kraft lignin. However, because of numerous technical difficulties, use of their demethylated lignin led to only about a 10% reduction in the phenol requirement in the adhesive. The difficulties generally involve the fact that kraft lignin is insoluble in an acidic reaction medium, isolation of the demethylated lignin by precipitation and premature gelling of the demethylated lignin.

An article by Enkvist et al, published in Tappi 45, 128(1962) suggests the possibility of using demethylated lignins to produce condensation polymers with formaldehyde. The material employed in this process was degradation products of a demethylation process used to produce simple compounds such as catechol and related substances. The "demethylated lignin", which was only a minor amount of the total obtainable material, was evaluated for its novolak properties, but not as a resol resin. Moreover, since the isolated demethylated lignin of this reference is somewhat insoluble under acidic conditions it would be rather difficult to prepare a novolak with acceptable properties. It should also be noted that novolaks are not used in adhesives for structural wood products.

In analyzing the problems encountered by the prior art in seeking to employ lignin in place of phenol in the production of wood adhesives, it should also be noted that another difficulty with using such lignin as the phenolic component in resin for wood adhesives is that lignin is less reactive than phenol itself. This problem of lower reactivity when using lignin in place of phenol is apparently the result of two separate causes. The first is that most of the necessary bonding sites for a phenolic-aldehyde-type resin are not available in lignin due to the very nature of the material. The second problem derives from the fact that when lignin is isolated by prior art methods such as those noted above, only a fraction of the original material is actually isolated. Usually the lower molecular weight component is not isolated but instead is lost during the recovery step. Moreover, as a consequence of this reduced reactivity, compared to phenol, a resol prepolymer prepared using lignin requires a longer cure time at elevated temperature and the resulting glueline does not exhibit the same strength properties as a phenol-formaldehyde resol. These conditions also are considered highly unacceptable to the wood products industry. Consequently there are no processes which are widely acceptable to the industry which enable lignin to be substituted for phenol in the manufacture of resol resins.

SUMMARY OF THE INVENTION

Applicant has found that the foregoing problems can be overcome by the hereinafter described extraction methods which are based upon (1) demethylation of the lignin to provide the necessary bonding sites required for production of a phenolic-aldehyde-type resin, and (2) the use of certain organic solvents for increasing the efficiency of lignin isolation from a demethylated lignin source such as raffinate and thereby make more material (including the lower-molecular-weight lignin material of the overall demethylated lignin source) recoverable and (3) where necessary, acidification of the demethylated lignin-containing source material prior to solvent extraction. These advantages are obtained through the use of organic solvents which are further characterized by the fact that they are both polar and at least partially water immiscible. They can be employed as extracting agents for the removal of demethylated lignin from various demethylated lignin-containing aqueous solutions in general, and from acidified aqueous solutions in particular. That is to say that a subject demethylated lignin-containing aqueous solution may already be acidified when it is introduced as a raw material for the herein disclosed processes or it may be acidified as part of the overall disclosed process. Thus for example since raffinate is alkaline, it would have to be acidified to carry out the herein disclosed demethylated lignin extraction process. In either case, however, the chief object of this invention is to at least partially or even completely replace the petroleum derived phenolic component in prior art phenol-formaldehyde type resins with a modified lignin material, e.g., demethylated lignin obtained from certain nonpetroleum, lignin-derived materials such as pulping spent liquor, regardless of process, as well as any by-product material from biomass processing which also has undergone some degree of demethylation. It is contemplated that all varieties of demethylated lignin, regardless of origin, may be beneficiated with respect to their resin forming properties by the extraction methods described in this patent disclosure. That is to say that the chemical methods and processes used for accomplishing the demethylation which the lignin source has previously undergone is not a part of the overall inventive concept of this disclosure; several such methods have been patented or otherwise described in the literature. The most common example of such a demethylated lignin source is the raffinate which is a by-product of dimethyl sulfide production which can be carried out in conjunction with wood pulping operations.

Preferably the lignin used in the herein disclosed processes will be demethylated to some predetermined extent which will be dependent upon the increase in reactivity toward phenolic-aldehyde resin formation which is desired. Thus, for example, a demethylated lignin of from about 9% to about 4% methoxy content can be employed to produce resins having greater reactivities than typical phenol-formaldehyde resins.

Regardless of its source, however, applicant has established that any demethylated lignin can be much more effectively extracted from a demethylated lignin-containing aqueous solution by use of processes which use an organic solvent to recover the lignin from the aqueous solution once it is properly acidified. Again, the organic solvent is most preferably a polar, and at least a partially water-immiscible, substance. Representative organic solvents having the attributes of polarity, and at least partial water immiscibility, would include esters such as, for example, ethyl acetate (which is preferred) propyl acetate, butyl acetate, amyl acetate and the like, ketones such as, for example 2-butanone (methyl ethyl ketone, which is preferred), 2-pentanone, 3-pentanone, 2-hexanone, 3-hexanone and like polar, partially water-immiscible organic solvents.

The use of these recovery methods produce recovery yields of from about 68% to almost 100% of the demethylated lignin present in the demethylated lignin-containing solution are achievable. For example, about 97% of the demethylated lignin in a raffinate can be obtained by the herein disclosed methods. Moreover, much of the low-molecular-weight demethylated lignin material, which is generally not recovered by prior art demethylated lignin recovery methods, is made recoverable by this process. This inability of the prior art methods to recover low-molecular weight portions of the demethylated lignin material (e.g., that demethylated lignin material which is obtained at recovery yields in excess of about 68%, and more preferably in excess of about 90%, of the demethylated lignin in a lignin-containing solution such as raffinate and/or wherein "low molecular weight" is taken to mean demethylated lignins having molecular weights of less than about 1000) follows from the fact that demethylation of lignin results in catechol formation which, in turn, considerably increases the water solubility of the material, especially that of the low-molecular-weight material. Again, isolation and/or extraction of demethylated lignin by employment of prior art methods for lignin isolation, which usually involve only acidification of the solution and precipitation of the lignin, are not nearly as effective. To some degree this relative ineffectiveness also follows from the fact that the required washing of the precipitated demethylated lignin results in considerable loss of material due to solubilization.

In any case, applicant has found that not only do the methods of this invention produce demethylated lignin yields much higher (e.g., 68% to virtually 100% of the demethylated lignin present) than the prior art recovery methods, but that resol resins made from demethylated lignins so recovered, are capable of being partially or exclusively used in place of petroleum-derived phenolic materials in the production of resol resins. That is to say that applicant has found that when demethylated lignins are recovered at yields greater than about 67%, but preferably greater than about 90% of the lignin content of the lignin-containing solution, then low molecular weight demethylated lignins are recovered (again low molecular weight lignins generally may be considered as those demethylated lignins having molecular weights less than about 1000) and that the presence of these low molecular weight demethylated lignins in an overall demethylated lignin formulation comprising both high molecular weight demethylated lignin and low molecular weight lignin causes the overall demethylated lignin formulation to produce, when reacted with one or more appropriate aldehydes, resol resins which are especially well suited for the production of wood adhesives.

Applicant believes that these advantages follow from the fact that when demethylated lignin having a low molecular weight demethylated lignin component, and especially demethylated lignin produced by the methods of this patent disclosure, is used as a supplement or replacement for petrochemical phenol in resol resins, such demethylated lignin is more reactive than the phenol itself, whereas in the case of lignin, not demethylated, the reverse is true. Applicant also believes that the presence of a low molecular weight demethylated lignin component in the bulk demethylated lignin also encourages much more effective cross linking reactions with the aldehyde in the production of resol resins. It should again be noted that demethylation of lignin results in catechol formation and it is well known that catechol is more reactive than phenol. The catechol formation also provides additional binding sites on the lignin needed for resol formation. Moreover, it should again be noted that the gel times of such demethylated lignin-formaldehyde resol resins are shorter than those of phenol-formaldehyde resol resins. Thus, this patent disclosure specifically contemplates certain novel compositions of matter (i.e., those resol resins made from reactions of aldehydes with demethylated lignins having a low molecular weight demethylated lignin component) as well as the reactions from which such compositions are made and the reactions from which demethylated lignin may be extracted.

Stated in more detailed process terms the herein-disclosed methods for extracting demethylated lignin from a demethylated lignin-containing aqueous solution comprise: (1) mixing a demethylated lignin-containing solution, and especially a demethylated lignin-containing solution which is acidified by use of certain acids hereinafter more fully described (again those skilled in this art will appreciate that, by way of example, raffinate is alkaline and would have to be acidified in order to carry out the herein disclosed demethylated lignin extraction process) with a polar, partially water immiscible organic solvent to form a demethylated lignin-containing aqueous solution/organic solvent mixture; (2) allowing the demethylated lignin-containing aqueous solution/organic solvent mixture to form at least two layers or phases wherein at least one of the two phases is an aqueous phase and at least one of the phases is an organic solvent phase which contains at least a portion of the demethylated lignin contained in the demethylated lignin-containing aqueous solution; (3) separating the aqueous phase from the organic solvent phase; and (4) recovering the demethylated lignin contained in the organic solvent phase.

The above-described general method of lignin recovery contemplates several more specific versions such as, for example, versions wherein: (1) the demethylated lignin dissolved in the demethylated lignin-containing aqueous solution is demethylated kraft lignin; (2) the polar, partially water immiscible organic solvent is selected from the group consisting of esters such as ethyl acetate propyl acetate, butyl acetate amyl acetate and ketones such as 2-butanone (methyl ethyl ketone), 2-pentanone, 3-pentanone, 2-hexanone and 3-hexanone and like polar, partially water immiscible organic solvents; (3) the demethylated lignin-containing aqueous solution is acidified to a pH of from about 5 to about 2; (4) the separation is carried out in a temperature range of from about 10° to about 80° C. and preferably at ambient pressure conditions; (5) the demethylated lignin-containing aqueous solution/organic solvent mixture is acidified to a pH of from about 5 to about 2 by use of an acid selected from the group consisting of a mineral acid such as sulfuric acid, hydrochloric acid and phosphoric acid, as well as by organic carboxylic acids such as oxalic acid, formic acid, acetic acid and lactic acid; (6) the demethylated lignin-containing aqueous solution is a raffinate from the production of the dimethyl sulfide produced from the spent liquor from wood pulping operations; (7) the demethylated lignin-containing aqueous solution/organic solvent mixture is produced by mixing, preferably by mechanical agitation, about 1 to about 5 parts by weight of a raffinate having from about 5% to about 75% solids content, with about 1 to about 5 parts by weight ethyl acetate (solids content is of course determined by the amount of water added); (8) the demethylated lignin-containing aqueous solution/organic solvent mixture is acidified to a pH of about 3.0 after the organic solvent is added to demethylated lignin-containing aqueous solution; (9) the separating of the aqueous phase from the organic solvent phase is aided by counter current solvent extraction or by centrifuging and partitioning the aqueous solution/organic solvent mixture; (10) the aqueous phase is extracted more than once with a polar, partially water immiscible organic solvent; (11) more than one aqueous phase is extracted by a polar, partially water immiscible organic solvent, combined and washed with water before recovering the demethylated lignin; and (12) the recovery of the demethylated lignin from the organic solvent phase is accomplished by evaporation of the organic solvent, flash drying or a general drying of the resulting demethylated lignin by other methods well known to the art.

Also stated in more detailed process terms the herein disclosed processes also contemplate methods for employing a demethylated lignin dissolved in a demethylated lignin-containing alkaline aqueous solution (e.g., raffinate) to produce a resol resin, (such as, for example, those resol resins used in the manufacture of wood adhesives) which methods preferably comprise: (1) mixing a demethylated lignin-containing aqueous solution with a polar, partially water immiscible organic solvent to form a demethylated lignin-containing aqueous solution/organic solvent mixture; (2) allowing the lignin-containing aqueous solution/organic solvent mixture to form two or more phases or layers wherein at least one of the two or more phases is an aqueous phase and at least one of the two or more phases is an organic solvent phase which contains at least a portion of the demethylated lignin contained in the demethylated lignin-containing aqueous solution; (3) separating the aqueous phase from the organic solvent phase; (4) recovering the demethylated lignin contained in the organic solvent phase; (5) dissolving the recovered demethylated lignin in an alkaline medium (preferably, wherein the alkali used to produce the alkaline medium is selected from the group consisting of metal hydroxides such as sodium hydroxide, potassium hydroxide and calcium hydroxide to produce a reaction medium having a pH of from about 7.5 to about 13.5 (and more preferably from about 9 to about 11); (6) reacting (at a temperature of about 40° C. to about 105° C., and preferably at ambient pressure) the demethylated lignin with an aldehyde source in said alkaline medium to form a resole resin; and (7) recovering said resole resin by known (e.g., flash drying, evaporation, etc.) recovery methods. Preferably the aldehyde source which yields formaldehyde. Those skilled in this art will also appreciate that the resulting resol resin need not be dried in order to use it in the further production of adhesives. For example, resol resins having from about 40% to about 60% solids content may be used in conjunction with other ingredients to make the adhesive.

The general method of resol resin production also contemplates several specific versions such as, for example, versions specifically adopted for wood adhesive production wherein: (1) the aldehyde source is capable of producing formaldehyde, such as, for example, an aldehyde selected from the group consisting of formaldehyde, paraformaldehyde, hexamethylenetetramine, and also other aldehydes such as acetaldehyde, and furfural; (2) the demethylated lignin dissolved in the demethylated lignin-containing alkaline aqueous solution is demethylated kraft lignin; (3) the polar, partially water immiscible organic solvent is selected from the group consisting of esters such as ethyl acetate (which is preferred), propyl acetate, butyl acetate and amyl acetate and ketones such as 2-butanone (which is preferred), 2-pentanone, 3-pentanone, 2-hexanone and 3-hexanone; (4) the demethylated lignin-containing aqueous solution is acidified to a pH of from about 5 to about 2; (5) the demethylated lignin-containing aqueous solution/organic solvent mixture is acidified to a pH of about 3 by use of a mineral acid selected from the group consisting of sulfuric acid, hydrochloric acid, phosphoric acid and/or an organic carboxylic acids such as oxalic acid, formic acid acetic acid and lactic acid; (6) the demethylated lignin-containing aqueous solution is a raffinate from the production of the dimethyl sulfide produced as a by-product from wood pulping operations; (7) the demethylated lignin-containing aqueous solution/organic solvent mixture is produced by mixing, preferably by mechanical agitation, about 1 to about 5 parts by weight of a raffinate having from about 5% to about 75% solids content, with about 1 to about 5 parts by weight ethyl acetate (again, the solids content is of course a function of the amount of water added); (8) the demethylated lignin-containing aqueous solution/organic solvent mixture is acidified to a pH of about 3.0 after the organic solvent is added to demethylated lignin-containing aqueous solution; (9) the separation is carried out at a temperature between about 10° C. and 80° C., and preferably at ambient pressure; (10) the separating of the aqueous phase from the organic solvent phase is carried out by counter current solvent extraction and/or by centrifuging and partitioning the demethylated lignin-containing aqueous solution/organic solvent mixture; (11) the aqueous phase is extracted more than once with one or more than one polar, partially water immiscible organic solvent; (12) more than one aqueous phase is extracted by a polar, partially water immiscible organic solvent, combined and washed with water before recovering the final demethylated lignin product; (13) recovery of the demethylated lignin from the organic solvent phase is accomplished by evaporation of the organic solvent under reduced pressure and drying of the resulting demethylated lignin under vacuum, or by flash drying; and (14) the reaction of the demethylated lignin with the aldehyde in the alkaline medium is carried out in conjunction with a phenolic component, other than the demethylated lignin, in order to form a resole resin. That is to say that the resol resin production methods of this patent disclosure also specifically contemplate reactions of the demethylated lignin with an aldehyde in an alkaline medium which are carried out in conjunction with one or more phenolic components, other than the demethylated lignin, in order to form a resole resin and wherein said phenolic components is provided by phenols selected from the group consisting of phenol, resorcinol, cresol, catechol and the like; and especially reactions of this type wherein a degree of demethylation of the lignin in the demethylated lignin-containing aqueous solution is determined by a specified reactivity level of the resol resin desired.

DESCRIPTION OF THE PREFERRED EMBODIMENTS

The following examples are presented for purposes of illustration only, and are not intended to limit the scope of the inventive concepts of this patent disclosure. For example, the method of isolating demethylated lignin using the herein disclosed solvent extraction process should not vary substantially with the original source of the lignin material, nor should the use of such isolated demethylated lignin vary substantially in the preparation of resol resins for adhesives.

EXAMPLE 1

Concentrated black liquor from a kraft pulping process, which contains kraft lignin, was demethylated using elemental sulfur by a known commercial process for the production of dimethyl sulfide. This liquor, known as the raffinate from dimethyl sulfide production, was employed as a starting material for the isolation of the resulting demethylated lignin.

A 320 gram sample of raffinate (specific gravity at 50% solids content 1.40) was diluted with 250 ml. of water and 750 ml. of ethyl acetate added. The resulting mixture was stirred vigorously while 260 ml. of 4 normal sulfuric acid was added dropwise until a pH 3 was reached. The mixture was stirred for an additional 20 minutes after completion of the sulfuric acid addition, and it was then centrifuged and partitioned. The aqueous layer was extracted three additional times with 30 ml. of ethyl acetate each time. The aqueous layer had changed from an original black color to tan and since it is the lignin which is responsible for the color this indicated almost complete removal of the lignin from the aqueous layer into the organic solvent. The combined organic layer was washed three times with 150 ml. of water. The organic layer was evaporated under reduced pressure at 40 degrees Celsius and dried under vacuum to afford 61 gms. of demethylated lignin as a dark brown solid, yield 97% based on original lignin content of the black liquor.

EXAMPLE 2

A resol resin was prepared utilizing the demethylated lignin isolated from the raffinate. The lignin was assumed to be 60% demethylated, which would mean a molecular weight of 171 for the monomeric unit. The optimum molar ratio for resol formation was determined as demethylated lignin, paraformaldehyde and sodium hydroxide of 1:2.5:0.9, respectively. The lignin was added first to the alkaline solution until virtually all dissolved. The paraformaldehyde (or 37% formalin can be used) is then slowly added to the solution. The reaction conditions are 60 to 65 degrees Celsius for 1½ to 2 hours and cooling of the mixture afterwards. Because of the higher molecular weight of the demethylated lignin compared to phenol, only 60% as much formaldehyde is required.

This resol resin utilizing demethylated lignin is more reactive than a commercial phenol-formaldehyde resin. At 113 degrees Celsius, the lignin-containing resin will gel in 10 minutes, whereas the commercial resin require 19 minutes, and at the higher temperature of 121 degrees Celsius, the values are 7 minutes and 12.5 minutes, respectively. The demethylated lignin-formaldehyde resol resin gave a glueline which exceeds the British Standard 1204:1964 in both the cold soak and boil test by a considerable margin. The British Standard values (see generally B.S. 1204: 1964, Standards Information Services 401.01, National Bureau of Standards, Washington, D.C. 20234) are 500 psi and 325 psi, respectively, for cold soak and boil test shear strength values.

Those skilled in this art will appreciate that even though the most obvious use of the herein disclosed methods of extracting lignins is in the further production of resol resins, the methods employed may be applied to other lignin extraction processes. Moreover, the conditions employed in such reactions will be those appropriate to some particular version of such reactions. Moreover, the demethylated lignins produced by such methods may have uses in addition to their use in producing resol resins used to manufacture wood adhesives. Thus, while this invention generally has been described in terms of the general discussions, specific examples and preferred embodiments, none of these should be taken individually as a limit upon the inventive concepts which are set forth in the following claims.

Thus having disclosed my invention; I claim:

1. A method for extracting demethylated lignin from a demethylated lignin-containing aqueous solution, said method comprising:
    (1) mixing the demethylated lignin-containing aqueous solution with a polar, partially water immiscible organic solvent to form a demethylated lignin-containing aqueous solution/organic solvent mixture;
    (2) allowing the demethylated lignin-containing aqueous solution/organic solvent mixture to form at least two phases wherein at least one of the at least two phases is an aqueous phase and at least one of the at least two phases is an organic solvent phase which contains at least a portion of the demethylated lignin which was contained in the demethylated lignin-containing aqueous solution;

(3) separating the aqueous phase from the organic solvent phase; and (4) recovering the demethylated lignin contained in the organic solvent phase.

2. The method of claim 1 wherein the demethylated lignin-containing aqueous solution is acidified if it is not already acidified when it is subjected to the method of claim 1.

3. The method of claim 1 wherein the demethylated lignin dissolved in the demethylated lignin-containing aqueous solution is demethylated kraft lignin.

4. The method of claim 1 wherein the polar, partially water immiscible organic solvent is an ester selected from the group consisting of ethyl acetate, propyl acetate, butyl acetate and amyl acetate.

5. The method of claim wherein the polar, partially water immiscible, organic solvent is a ketone selected from the group consisting of 2-butanone, 2-pentanone, 3-pentanone, 2-hexanone and 3-hexanone.

6. The process of claim 1 wherein at least 68% of the demethylated lignin in the demethylated lignin-containing aqueous solution is recovered.

7. The process of claim 1 wherein at least 90% of the demethylated lignin in the demethylated lignin-containing aqueous solution is recovered.

8. The method of claim 1 wherein the demethylated lignin-containing aqueous solution is acidified to a pH of from about 5 to about 2.

9. The method of claim 1 wherein the demethylated lignin-containing aqueous solution/organic solvent mixture is acidified to a pH of from about 5 to about 2 by use of a mineral acid selected from the group consisting of sulfuric acid, hydrochloric acid and phosphoric acid.

10. The method of claim 1 wherein the demethylated lignin-containing aqueous solution/organic solvent mixture is acidified to a pH of from about 5 to about 2 by use of an organic, carboxylic acid selected from the group consisting of oxalic acid, formic acid, acetic acid, and lactic acid.

11. The method of claim 1 wherein the demethylated lignin-containing aqueous solution is a raffinate from the production of the dimethyl sulfide produced from spent liquor from wood pulping operations.

12. The method of claim 1 wherein the demethylated lignin-containing aqueous solution/organic solvent mixture is produced by mixing, by mechanical agitation, about 1 to about 5 parts by weight of a raffinate having from about 5% to about 75% solids content with about 1 to about 5 parts by weight ethyl acetate.

13. The method of claim 1 wherein the demethylated lignin-containing aqueous solution/organic solvent mixture is acidified to a pH of about 3.0 after the organic solvent is added to the demethylated lignin-containing aqueous solution and wherein the separation is carried out in the temperature range of from about 10° C. to about 80° C. and at ambient pressure.

14. The method of claim 1 wherein the separating of the aqueous phase from the organic solvent phase is by counter current solvent extraction.

15. The method of claim 1 wherein the recovery of the demethylated lignin from the organic solvent phase is accomplished by evaporation of the organic solvent and drying the resulting demethylated lignin.

* * * * *